(12) United States Patent
Mittal et al.

(10) Patent No.: US 10,672,756 B2
(45) Date of Patent: Jun. 2, 2020

(54) AREA AND POWER EFFICIENT CIRCUITS FOR HIGH-DENSITY STANDARD CELL LIBRARIES

(71) Applicant: Samsung Electronics Co., Ltd., Suwon-si, Gyeonggi-do (KR)

(72) Inventors: Sajal Mittal, Bengaluru (IN); Abhishek Ghosh, Bengalura (IN); Utkarsh Garg, Bengaluru (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/238,009

(22) Filed: Jan. 2, 2019

(65) Prior Publication Data
US 2020/0144245 A1    May 7, 2020

(30) Foreign Application Priority Data
Nov. 5, 2018   (IN) .............................. 201841041881

(51) Int. Cl.
*G06F 7/50*       (2006.01)
*H01L 27/02*    (2006.01)
(Continued)

(52) U.S. Cl.
CPC ........ *H01L 27/0207* (2013.01); *G06F 30/392* (2020.01); *H03K 19/018521* (2013.01);
(Continued)

(58) Field of Classification Search
CPC ............. G06F 17/5072; H01L 27/0207; H01L 2027/11811; H01L 2027/11837
See application file for complete search history.

(56) References Cited

U.S. PATENT DOCUMENTS 4,831,578 A * 5/1989 Bui .......................... G06F 7/501
708/702
4,866,658 A * 9/1989 Mazin ..................... G06F 7/503
708/702

(Continued)

*Primary Examiner* — Alexander H Taningco
*Assistant Examiner* — Kurtis R Bahr
(74) *Attorney, Agent, or Firm* — Harness, Dickey & Pierce P.L.C.

(57) ABSTRACT

Example embodiments provides a full adder integrated circuit (ADDF) for improving area and power of an integrated circuit (IC). The method includes receiving three input signals and generating three corresponding complementary output signals. Further, the method includes generating an internal signal using two complementary output signals out of the generated three corresponding complementary output signals, and one of the three input signals. Further, the method includes generating an output summation signal using a complementary output signal out of the generated three corresponding complementary output signals, the generated internal signal and a complementary internal signal of the generated internal signal. Further, the method includes generating a carry-out signal using two complementary output signal out of the generated three corresponding complementary output signals, the generated internal signal and the complementary internal signal. Example embodiments herein also provide a four input multiplexer Integrated circuit (MXT4) for reducing the area of the IC.

19 Claims, 7 Drawing Sheets

(51) Int. Cl.
*H03K 19/0185* (2006.01)
*G06F 30/392* (2020.01)
*H01L 27/118* (2006.01)

(52) U.S. Cl.
CPC .............. *H01L 2027/11811* (2013.01); *H01L 2027/11837* (2013.01)

(56) References Cited

U.S. PATENT DOCUMENTS

| | | | | |
|---|---|---|---|---|
| 5,343,418 | A * | 8/1994 | Zinger | G06F 7/501 |
| | | | | 708/702 |
| 5,875,124 | A * | 2/1999 | Takahashi | G06F 7/501 |
| | | | | 708/702 |
| 5,905,667 | A | 5/1999 | Lee | |
| 6,505,226 | B1 * | 1/2003 | Ahn | G06F 7/501 |
| | | | | 708/707 |
| 7,185,042 | B1 * | 2/2007 | Pasqualini | G06F 7/501 |
| | | | | 708/702 |
| 7,256,633 | B1 | 8/2007 | Rafiq | |
| 9,419,014 | B2 | 8/2016 | Gurumurthy | |
| 9,471,278 | B2 * | 10/2016 | Nandi | G06F 7/501 |
| 2005/0102345 | A1 * | 5/2005 | Belluomini | G06F 7/607 |
| | | | | 708/708 |
| 2009/0167351 | A1 * | 7/2009 | Agarwal | H03K 19/177 |
| | | | | 326/41 |
| 2013/0032885 | A1 | 2/2013 | Swamynathan et al. | |
| 2014/0167815 | A1 | 6/2014 | Penzes | |

\* cited by examiner

AREA AND POWER EFFICIENT CIRCUITS FOR HIGH-DENSITY STANDARD CELL LIBRARIES

TECHNICAL FIELD

This application claims benefit of priority to India Patent Application 201841041881 filed on Nov. 5, 2018 in the India Intellectual Property Office, the disclosure of which is incorporated herein by reference in its entirety.

Example embodiments of the present disclosure relate to the field of semiconductor integrated circuits. For example, at least some example embodiments relate to producing an improved (or, alternatively, optimized) area and power efficient cell structures for high density standard cell libraries.

BACKGROUND

A common method of designing an integrated circuit (IC) may utilize a library of standard cells and a behavioral circuit model for describing the functionality of the IC. The standard cells typically include fundamental logic gates such as OR, NAND, NOR, AND, XOR, inverter, and like logical cells with an array of logic gate sizes. These cells also include sequential circuit elements such as latches and flip-flops for memory requirements. Generally, the library of standard cells are generated by a layout designer manually.

To design the ICs to utilize less area, high density standard cell libraries with area-efficient circuits may be used to help reduce area at block level. In design rule check (DRC) stringent technologies, each and every metal connection used in a layout causes routing congestion and results in higher area at the block level. Therefore, to improve (or, alternatively, optimize) the area at cell level, each and every circuit may need to be studied in an attempt to reduce (or, alternatively, minimize) the number of connections and improve (or, alternatively, maximize) the power sharing in layouts.

FIG. 1 illustrates a conventional full adder (ADDF) circuit, wherein the conventional ADDF circuit includes 8 transmission gates (TGs) and 7 inverters.

The conventional ADDF is based on the TGs, wherein an input A, B or CI is not directly given to the TGs, so that input capacitance for the circuit is constant and not changing with the input condition. Further, the conventional ADDF may utilize buffers for the inputs, which may increase area overhead. Further, the inputs are transmitted through the TGs depending upon the inputs. Due to large number of the TGs, there are extra metal connections in the layout which results in an area penalty. Depending upon the input signal conditions some of the transmission gates are ON and an input signal is transmitted and output summation (SUM) and carryout (CO) signals are generated.

FIG. 2 illustrates a conventional four input multiplexer (MXT4), where the input is inverted and transmitted through different TGs based on selection input signals. Due to a large number of TGs present in the conventional MXT4, there may be a large number of metal connections and a large routing complexity thus leading to area overhead. The conventional MXT4 has 6 input signals A, B, C, D, S0 and S1. Hence depending upon the 4 input combinations of S0 and S1 signals, one of the input (A, B, C, D) signals goes to the output Y. Further, depending on the combination of S0 and S1, transmission gates are ON and input is transmitted to the output Y.

SUMMARY

Example embodiments provide an area and power efficient full adder (ADDF) circuit and/or a 4-input multiplexer (MXT4) circuit for high density standard cell libraries.

At least some example embodiments herein provide a full adder (ADDF) circuit.

In some example embodiments, the ADDF includes a complementary signal generator circuit configured to receive three input signals and generate three complementary output signals based on respective ones of the three input signals, the three input signals each having one of a high logic level and a low logic level; an internal signal generator circuit configured to generate an internal signal based on two of the three complementary output signals and one of the three input signals; a summation output signal generator circuit configured to generate an output summation (SUM) signal based on one of the three complementary output signals, the internal signal and a complementary internal signal, the complementary internal signal being complementary to the internal signal; and a carryout signal generator circuit configured to generate a carry-out signal (CO) based on the two of the three complementary output signals, the internal signal and the complementary internal signal.

In an example embodiment, the ADDF uses less number of transmission gates (TGs) in the internal signal generator circuit and the SUM output signal generator circuit, thereby reducing surface area of the IC.

At least some other example embodiments herein provide a four input multiplexer integrated circuit (MXT4).

In some example embodiments, the MXT4 includes a complementary signal generator circuit configured to receive two selection input signals and to generate two complementary selection output signals based on respective ones of the two selection input signals; and a p-type metal oxide semiconductor (PMOS) and an n-type metal oxide semiconductor (NMOS) stack switch circuit configured to transmit at least one input signal to an output based on the two selection input signals and the two complementary selection output signals.

In an example embodiment, the MXT4 does not use any transmission gates (TGs), thereby reducing surface area of the IC.

At least some other example embodiments herein provide a method for reducing area and power of an integrated circuit (IC) using a full adder Integrated circuit (ADDF), the method comprising: generating, by a complementary signal generator circuit, three complementary output signals based on respective ones of three input signals, the three input signals each being one of a high logic level and a low logic level; generating, by an internal signal generator circuit, an internal signal based on two of the three complementary output signals, and one of the three input signals; generating, by a summation output signal generator circuit, an output summation (SUM) signal based on one of the three complementary output signals, the internal signal and a complementary internal signal, the complementary internal signal being complementary to the internal signal; and generating, by a carryout signal generator circuit, a carry-out signal (CO) based on the two of the three complementary output signals, the internal signal and the complementary internal signal.

At least some other example embodiments herein provide a method generating, by a complementary signal generator circuit, two complementary selection output signals based on respective ones of two selection input signals; and transmitting, by a PMOS and a NMOS stack switch circuit, at least one input signal to an output based on the two selection input signals and the two complementary selection output signals.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

Example embodiments herein are illustrated in the accompanying drawings, throughout which like reference letters indicate corresponding parts in the various figures. The example embodiments herein will be better understood from the following description with reference to the drawings, in which.

DETAILED DESCRIPTION

Figure 1:
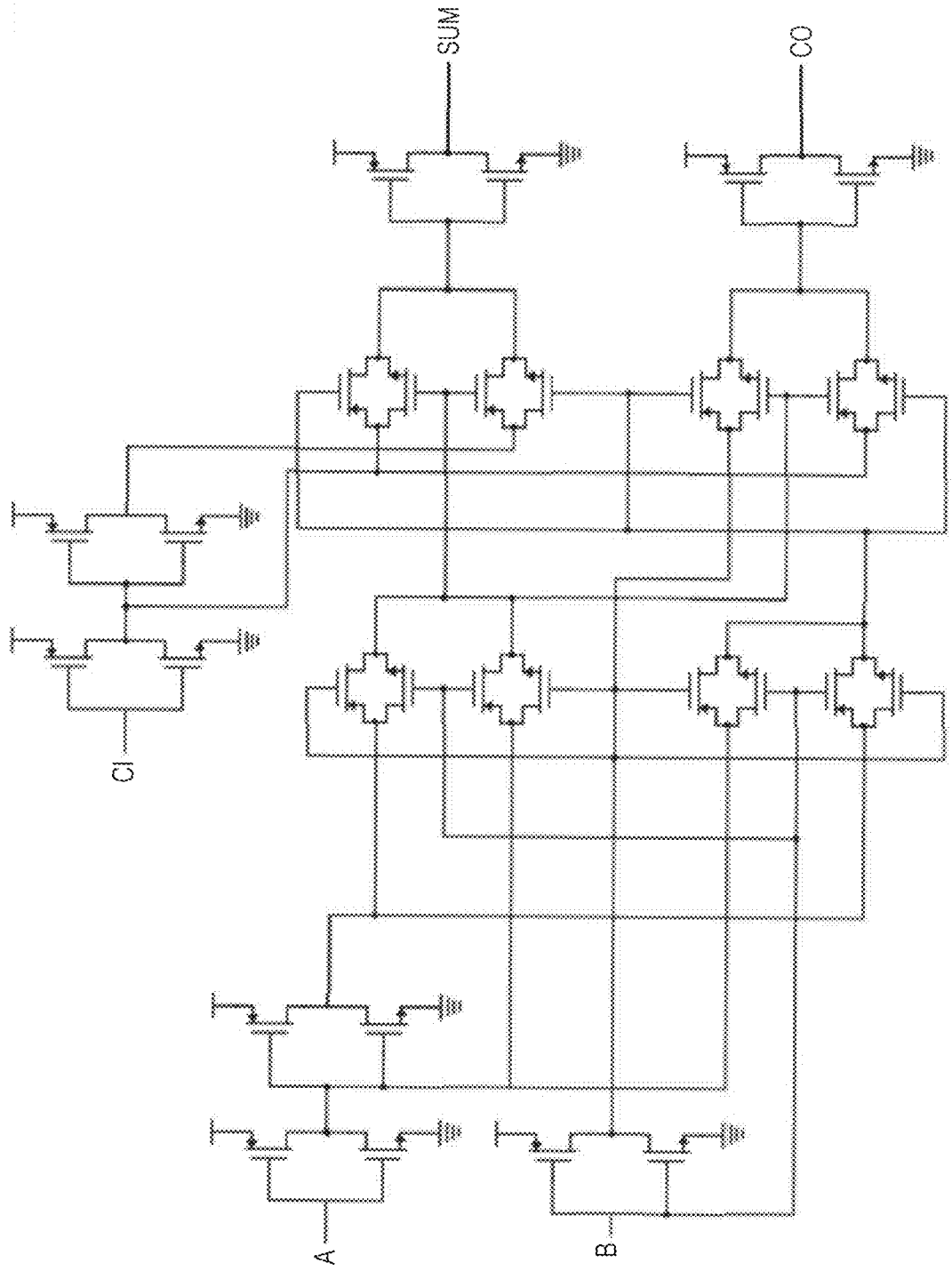
FIG. 1 illustrates a conventional full adder circuit.
Figure 2:
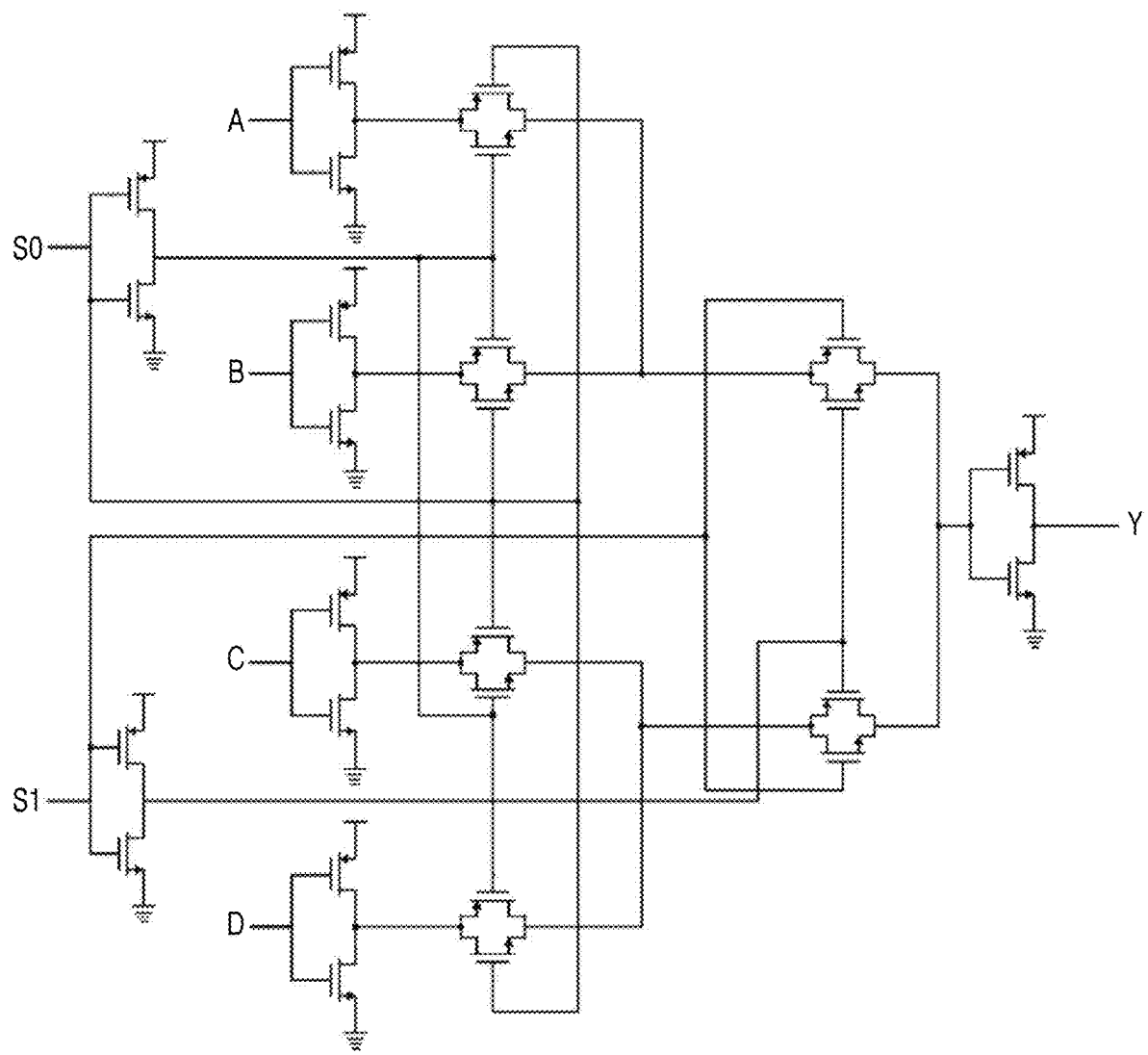
FIG. 2 illustrates a conventional 4-input multiplexer (MXT4) circuit.

Example embodiments herein and the various features and advantageous details thereof are explained more fully with reference to the non-limiting example embodiments that are illustrated in the accompanying drawings and detailed in the following description. Descriptions of well-known components and processing techniques are omitted so as to not unnecessarily obscure the example embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The example embodiments herein provide a full adder (ADDF) circuit for improving (or, alternatively optimizing) area and power of an integrated circuit (IC). The ADDF includes a complementary signal generator circuit to receive three input signals and generate corresponding complementary output signals for the received three input signals. The three input signals include at least one of a high logic level and a low logic level. Further, the ADDF includes an internal signal generator circuit to generate an internal signal using two complementary output signals out of the generated three corresponding complementary output signals, and one of the three input signals. Further, the ADDF includes a summation (SUM) output signal generator circuit to generate an output summation (SUM) signal using one complementary output signal out of the generated three corresponding complementary output signals, the generated internal signal and a complementary internal signal of the generated internal signal. Further, the ADDF include a carryout (CO) signal generator circuit configured to generate a carry-out signal (CO) using two complementary output signal out of the generated three corresponding complementary output signals, the generated internal signal and the complementary internal signal of the generated internal signal.

The example embodiments herein provide a four input multiplexer Integrated circuit (MXT4) for improving (or, alternatively, optimizing) area and power of an integrated circuit (IC). The MXT4 includes a complementary signal generator circuit to receive two selection input signals and generate corresponding complementary selection output signals for the received two selection input signals. Further, the MXT4 includes a p-type metal oxide semiconductor (PMOS) and a n-type metal oxide semiconductor (NMOS) stack switch circuit to transmit at least one input signal to an output based on the received two selection input signals and the generated corresponding two complementary selection output signals.

Referring now to the drawings, and more particularly to FIGS. 3 through 6, where similar reference characters denote corresponding features consistently throughout the figures, there are shown some example embodiments.

Figure 3:
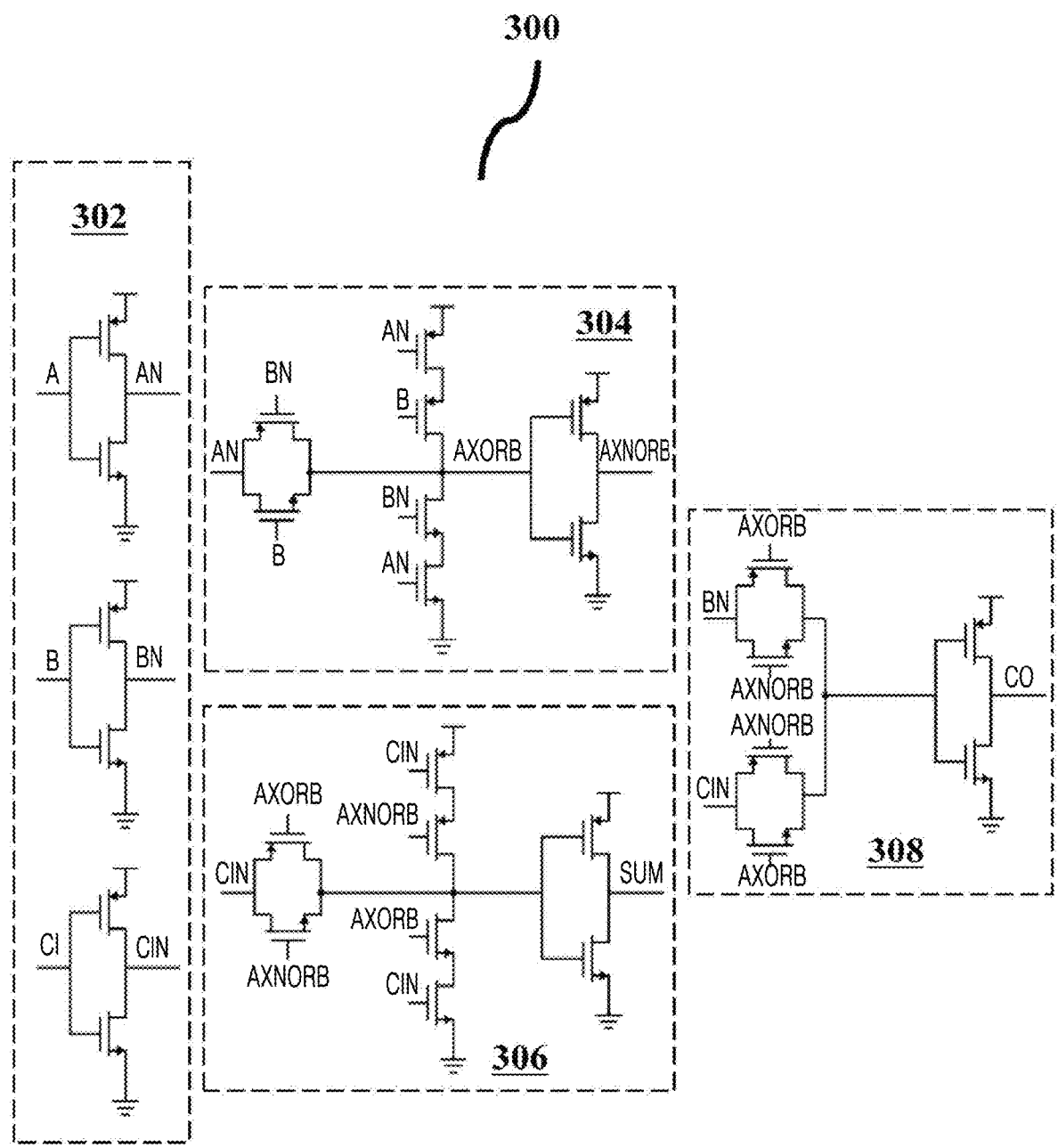
FIG. 3 illustrates a full adder (ADDF) circuit for high density standard cell libraries according to at least one example embodiment.
Figure 4:
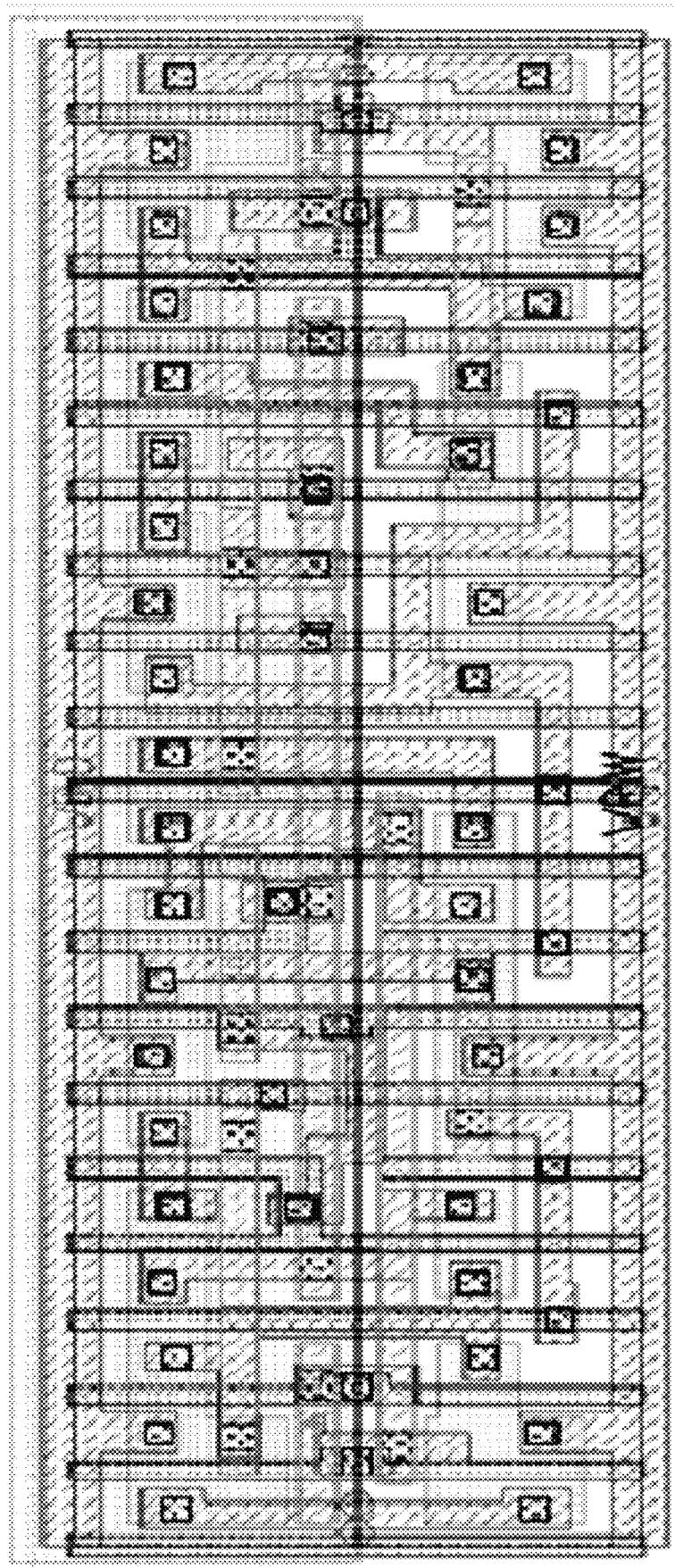
FIG. 4 illustrates a circuit layout of the ADDF circuit according to at least one example embodiment.

FIG. 3 illustrates a full adder (ADDF) 300 circuit for high density standard cell libraries, according to at least one example embodiments, and FIG. 4 illustrates a circuit layout of the ADDF 300 circuit for high density standard cell libraries.

Referring to FIGS. 3 and 4, in an example embodiment, the ADDF 300 may include a complementary signal generator circuit 302, an internal signal generator circuit 304, a summation (SUM) output signal generator circuit 306 and a carryout (CO) signal generator circuit 308.

The complementary signal generator circuit 302 includes one or more inverters. The one or more inverters can be configured to receive three input signals A, B and CI, wherein the three input signals A, B and CI are adapted to take values either high logic level or low logic level. Further, the one or more inverters can be configured to generate three corresponding complementary output signals AN, BN and CIN based on the three input signals A, B and CI.

The internal signal generator circuit 304 includes combination of transmission gates, PMOS and NMOS stack and an inverter. The internal signal generator circuit 304 can be configured to generate an internal signal AXORB using two complementary output signals (e.g., AN and BN) out of the three corresponding complementary output signals AN, BN and CIN and one of the three input signals (e.g., B). Further, the internal signal generator circuit 304 can be configured to generate a complementary internal signal (e.g., AXNORB).

The SUM output signal generator circuit 306 includes combination of transmission gates, a PMOS and a NMOS stack and an inverter. Further, the SUM output signal generator circuit 306 can be configured to generate an output SUM signal using one complementary output signal (e.g., CIN) out of the generated three corresponding complementary output signals AN, BN and CIN, the generated internal signal and the generated complementary internal signal of the generated internal signal.

The CO signal generator circuit 308 includes two inverter drivers for driving output signals. The CO signal generator circuit 308 can be configured to generate a carry-out signal (CO) using two complementary output signals (e.g., BN and CIN) out of the generated three corresponding complementary output signals AN, BN and CIN, the internal signal (e.g., AXORB) and the complementary internal signal (e.g., AXNORB) of the generated internal signal.

For example, the ADDF 300 can be configured to take 3-Input signals A, B and CI which can take values either high (Logic 1) or low (Logic 0). Hence, the ADDF 300 can be configured to receive a total of 8 input signal combinations. Further, the ADDF 300 can be configured to generate three complementary output signals depending on the input signals A, B and CI. The three complementary output signals includes AN, BN and CIN signals, which are complementary version of the input signals A, B and CI respectively. Further, the ADDF 300 can be configured to generate an internal signal for example, AXORB signal, which is generated based on the complementary output signals AN, BN and the input signal B. Further, the AXORB signal can be transmitted through an inverter and generates AXNORB signal, which is a complementary internal signal generated based on the internal signal. Further, a signal Z can be generated based on the signals CIN, AXORB and AXNORB. Further, the generated signal Z can be transmitted through the inverter and generates an output summation (SUM) signal. The output SUM signal has proper driver which provide glitch-less signal and which can be easily scalable. Similarly signal X is generated depending on the signals BN, CIN, AXORB and AXNORB. Further, the signal X can be transmitted through the inverter and generate output carry-out signal (CO).

Figure 5:
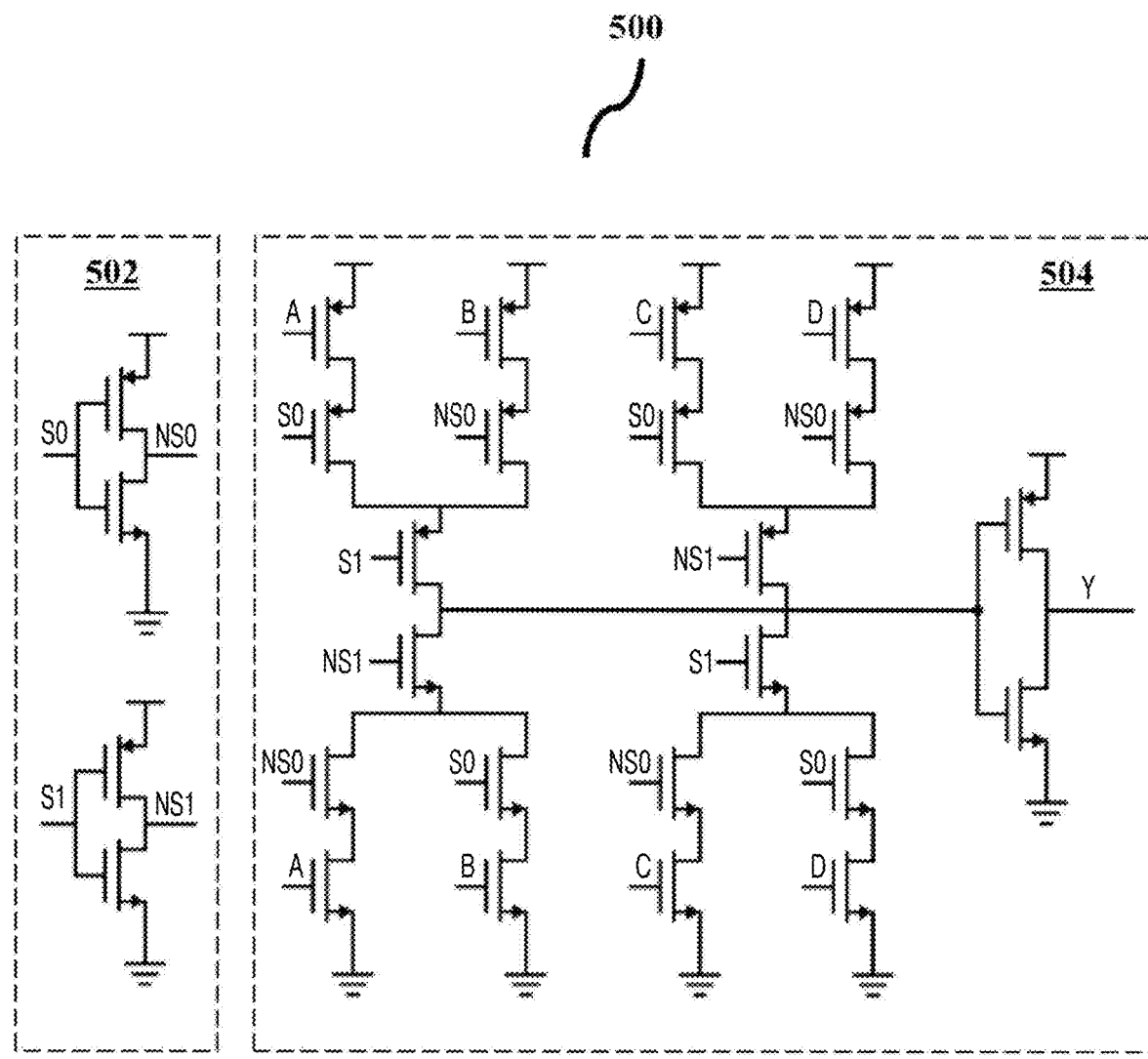
FIG. 5 illustrates 4-input multiplexer (MXT4) circuit for high density standard cell libraries according to at least one example embodiment.
Figure 6:
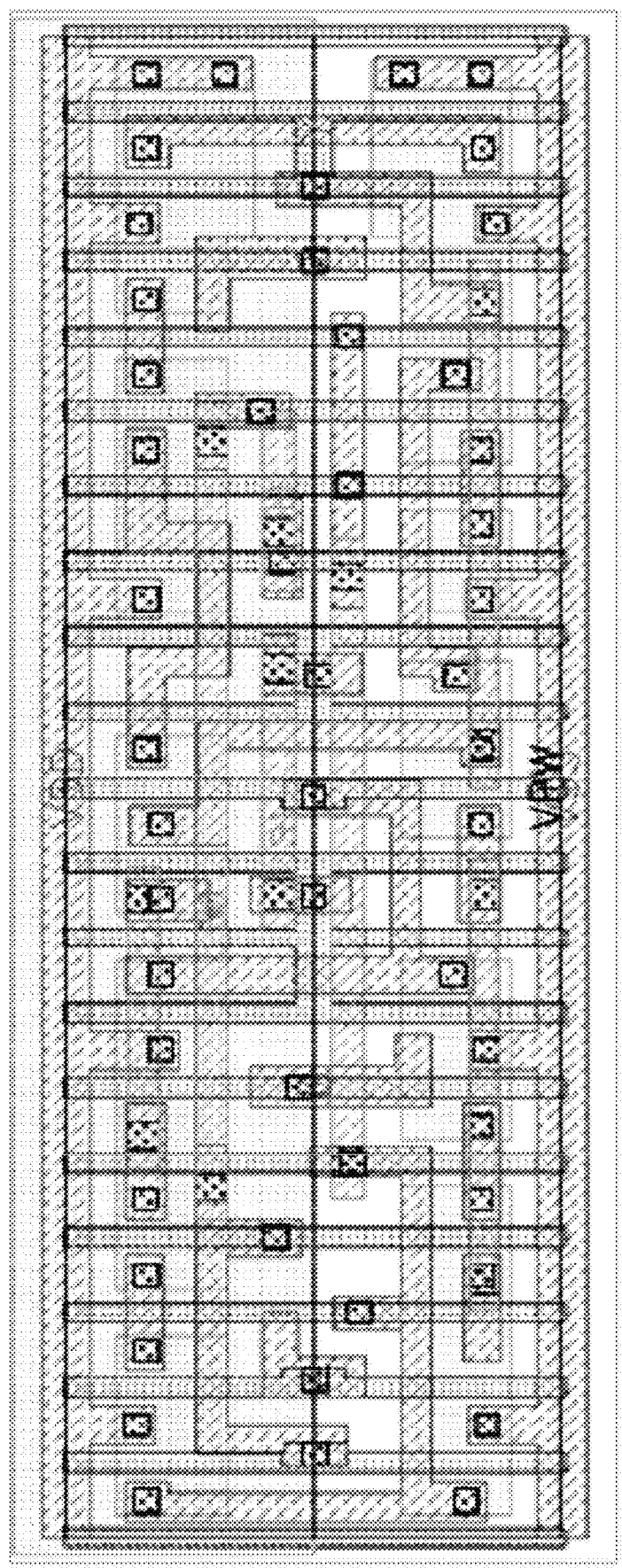
FIG. 6 illustrates a circuit layout of the MXT4 circuit according to at least one example embodiment.

FIG. 5 illustrates 4-input multiplexer (MXT4) circuit 500 for high density standard cell libraries, according to at least one example embodiment, and FIG. 6 illustrates a circuit layout of the MXT4 circuit for high density standard cell libraries.

Referring to FIGS. 5 and 6, in an example embodiment, the MXT4 circuit 500 includes a complementary signal generator circuit 502 and a PMOS and a NMOS stack switch circuit 504.

The complementary signal generator circuit 502 of the MXT4 circuit 500 can be configured to receive two selection input signals S0 and S1, and to generate corresponding complementary selection output signals NS0 and NS1 based on respective ones of the two selection input signals S0 and S1.

Further, depending on the selection input signal S0 and S1, the PMOS and the NMOS stack switch circuit 504 can be configured to transmit at least one of input signal A, B C and D as an output signal Y. The selection signals S0, S1, NS0 and NS1 are used as a control signals for the NMOS's and the PMOS's stack.

In an example embodiment, based on the combination of S0 and S1, the NMOS's and the PMOS's stack conducts and then the output signal Y can be pulled-down (goes to logic 0) or pulled-up (goes to logic 1) depending upon the at least one of input signals A, B, C and D.

The MXT4 circuit 500 doesn't use any of the input inverters, which is required only because of transmission gates (TGs). Since, the TGs are not used in the MXT4 design, which helps in closing the layout in lesser area.

Figure 7:
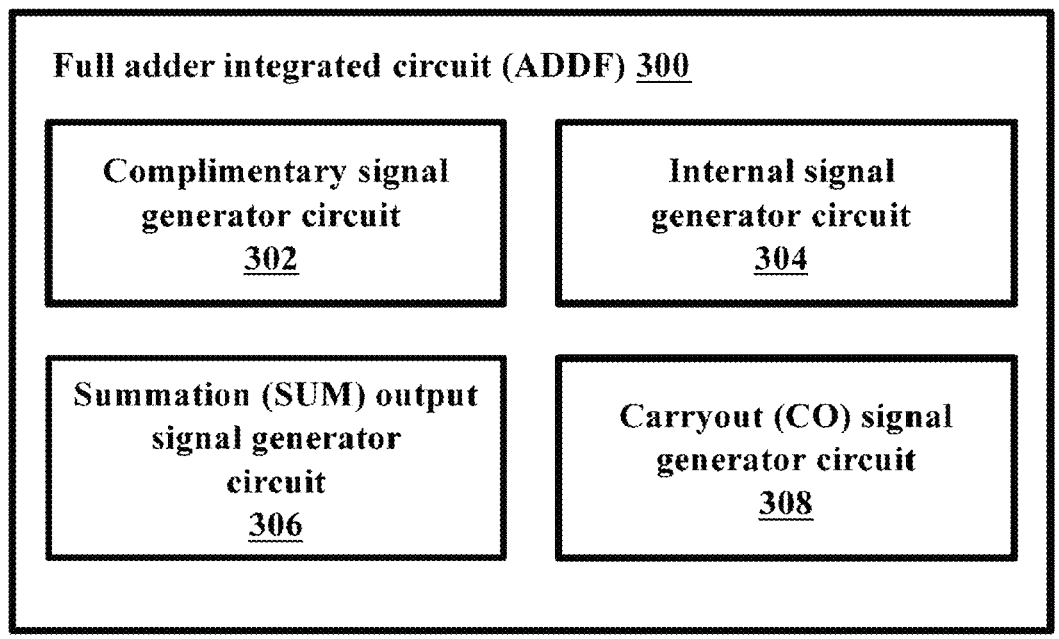
FIG. 7 is a block diagram illustrating various unit of the ADDF circuit according to at least one example embodiment.

FIG. 7 is a block diagram illustrating various unit of the ADDF 300 circuit, according to at least one example embodiment.

Referring to FIG. 7, The ADDF 300 includes the complementary signal generator circuit 302, the internal signal generator circuit 304, the SUM output signal generator circuit 306 and the CO signal generator circuit 308.

The complementary signal generator circuit 302 can be configured to receive three input signals A, B and C and generate three corresponding complementary output signals AN, BN and CIN based on respective ones of the three input signals A, B and C. The three input signals A, B and C each have one of the high logic level and the low logic level.

Further, the internal signal generator circuit 304 can be configured to generate an internal signal AXORB, BXORB or CXORB using two complementary output signals out of the three corresponding complementary output signals AN, BN and CIN, and one of the three input signals A, B and C.

The SUM output signal generator circuit 306 can be configured to generate an output SUM signal using one complementary output signal out of the three corresponding complementary output signals AN, BN and CIN, the internal signal AXORB, BXORB or CXORB and the complementary internal signal AXNORB, BXNORB or CXNORB associated with the internal signal AXORB, BXORB or CXORB.

The CO signal generator circuit 308 can be configured to generate a carry-out signal (CO) using two complementary output signals out of the three corresponding complementary output signals AN, BN and CIN, the generated internal signal AXORB, BXORB or CXORB and the complementary internal signal AXNORB, BXNORB or CXNORB associated with the internal signal AXORB, BXORB or CXORB.

The ADDF 300 can use less number of transmission gates (TGs) in the internal signal generator circuit 304 and the SUM output signal generator circuit 306, thereby reduces surface area of the IC.

Figure 8:
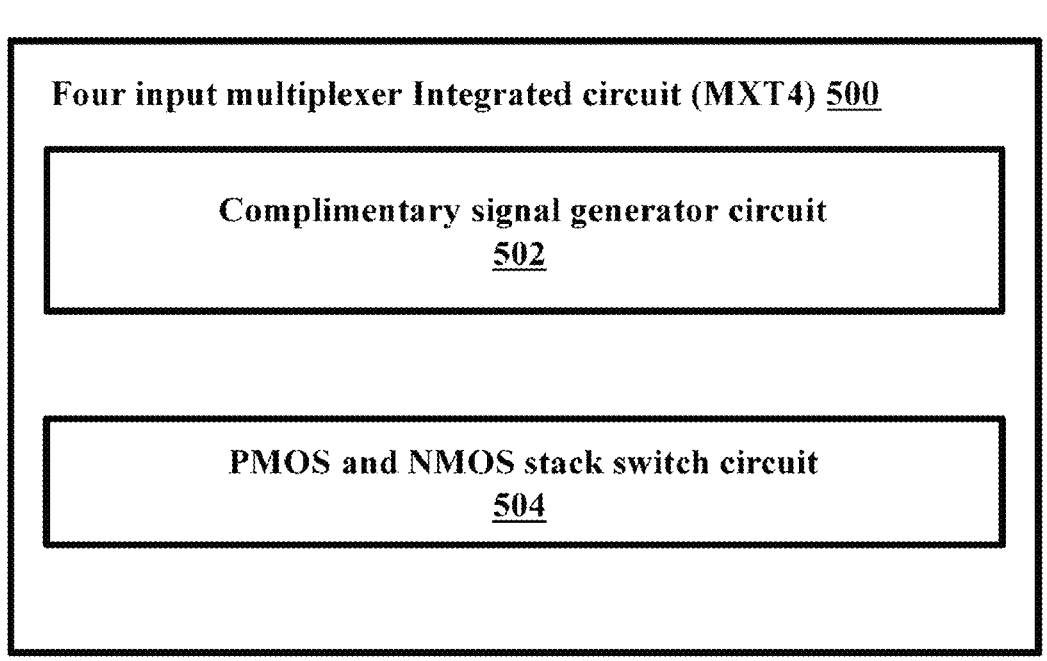
FIG. 8 is a block diagram illustrating various unit of the MXT4 circuit according to at least one example embodiment.

FIG. 8 is a block diagram illustrating various unit of the MXT4 circuit 500, according to at least one example embodiment.

Referring to FIG. 8, the MXT4 circuit 500 includes the complementary signal generator circuit 502 and the PMOS and the NMOS stack switch circuit 504.

The complementary signal generator circuit 502 can be configured to receive two selection input signals S0 and S1 and generate two corresponding complementary selection output signals NS0 and S1 based on respective ones of the two selection input signals S0 and S1.

Further, the PMOS and the NMOS stack switch circuit 504 can be configured to transmit at least one of input signals A, B, C or D as an output signal Y based on the two selection input signals S0, S1 and the two corresponding complementary selection output signals NS0 and NS1.

The MXT4 500 does not use any transmission gates (TGs), thereby reduces surface area of the IC.

The example embodiments disclosed herein can be implemented through at least one software program running on at least one hardware device and performing network management functions to control the elements. The elements shown in FIG. 3 and FIG. 5 can be at least one of a hardware device, or a combination of hardware device and software module.

A standard cell included in an IC may be selected from a standard cell library including information about a plurality of standard cells, based on a physical characteristic of the standard cell such as a function and a timing characteristic. By placing an instance of the selected standard cell, a layout of the IC may be generated.

The standard cell library may include a high density standard cell library that includes the full adder (ADDF) circuit 300 for high density standard cell libraries according to at least one example embodiment and/or the 4-input multiplexer (MXT4) circuit 500 for high density standard cell libraries according to at least one example embodiment.

The high density standard cell library may include information about characteristics of a plurality of standard cells having different characteristics. For example, the high density standard cell library may include information about a power characteristic, a timing characteristic, or a shape characteristic of the ADDF circuit 300 and/or the 4-input multiplexer (MXT4) circuit 500 according example embodiments.

According to an example embodiment, a computing system for designing an IC may generate layout data of an IC with reference to the standard cell library.

The computing system may include the processor, the memory, an input/output (I/O) device, a storage device and a bus.

The processor may be configured, through a layout design or execution of computer readable instructions stored in the memory, as a special purpose computer to perform at least one of various operations of designing the IC.

The processor may communicate with the memory, the I/O device, and the storage device through the bus. The processor may design a layout of the IC by performing a logic synthesis operation, a design for testability (DFT) logic insertion operation, a placement and routing (P&R) operation, a parasitic component extraction operation and/or a static timing analysis (STA) operation.

The logic synthesis operation may generate a netlist from data defining functions of the IC in a hardware description language (HDL). The placing and routing (P&R) operation may generate layout data for the IC by placing and routing standard cells that define the IC according to the netlist. The static timing analysis (STA) operation may be performed on the layout data, and if the analysis passes, a mask may be generated based on the layout data.

The IC may be manufactured using the mask by performing various semiconductor processes on a semiconductor substrate such as a wafer to form the semiconductor device in which the IC is implemented. For example, a process using a mask may refer to a patterning process through a lithography process. Through such a patterning process, a desired pattern may be formed on a semiconductor substrate or a material layer. Meanwhile, the semiconductor processes may include a deposition process, an etching process, an ion process, a cleaning process, and the like. In addition, the semiconductor process may include a packaging process for mounting the semiconductor device on a printed circuit board (PCB) and sealing it with a sealing material, and may include a test process for testing the semiconductor device or a package.

The memory may be a volatile memory such as static random access memory (SRAM) or dynamic random access memory (DRAM), or may be a non-volatile memory such as phase-change random access memory (PRAM), magnetoresistive random access memory (MRAM), resistive random access memory (ReRAM), ferroelectric random access memory (FRAM), or NOR flash memory.

The I/O device may control a user input and an output performed through user interface devices. For example, the I/O device may include one or more input devices such as a keyboard, a mouse device, and a touch pad and may receive input data which defines the IC. For example, the I/O device may include output devices such as a display and a speaker and may display a placement result, a routing result, an STA result, etc.

The storage device may include a memory card (for example, multimedia card (MMC), an embedded multimedia card (eMMC), a secure digital (SD) card, a MicroSD card, etc.), a solid state drive (SSD), a hard disk drive (HDD), and/or the like.

The foregoing description of some of the example embodiments will so fully reveal the general nature of the example embodiments herein that others can, by applying current knowledge, readily modify and/or adapt such specific example embodiments without departing from the example embodiments, and, therefore, such adaptations and modifications should and are intended to be comprehended within the meaning and range of equivalents of the disclosed example embodiments. It is to be understood that the phraseology or terminology employed herein is for the purpose of description and not of limitation. Therefore, while the example embodiments herein have been described in terms of some example embodiments, those skilled in the art will recognize that the example embodiments herein can be practiced with modification within the spirit and scope of the example embodiments as described herein.

What is claimed is:

1. A full adder integrated circuit (ADDF), the ADDF comprising:
   a complementary signal generator circuit configured to receive three input signals and generate three complementary output signals based on respective ones of the three input signals, the three input signals each having one of a high logic level and a low logic level;
   an internal signal generator circuit configured to generate an internal signal based on two of the three complementary output signals and one of the three input signals, the internal signal generator circuit including a first transistor, a second transistor, a third transistor and a fourth transistor connected in series between a source and ground such that gates of the first transistor and the fourth transistor both receive a first one of the two of the three complementary output signals;
   a summation output signal generator circuit configured to generate an output summation (SUM) signal based on one of the three complementary output signals, the internal signal and a complementary internal signal, the complementary internal signal being complementary to the internal signal; and
   a carryout signal generator circuit configured to generate a carry-out signal (CO) based on the two of the three complementary output signals, the internal signal and the complementary internal signal.

2. The ADDF of claim 1, wherein the complementary signal generator circuit includes one or more inverters.

3. The ADDF of claim 2, wherein the one or more inverters of the complementary signal generator circuit include three inverters configured to receive the respective ones of the three input signals without the three input signals being passed through buffers, and to generate the three complementary output signals based on the respective ones of the three input signals.

4. The ADDF of claim 1, wherein the internal signal generator circuit includes at least one transmission gate, a plurality of stacked transistors and an inverter.

5. The ADDF of claim 4, wherein the plurality of stacked transistors of the internal signal generator circuit includes the first transistor, the second transistor, the third transistor and the fourth transistor connected in series between the source and the ground, the first transistor and the second transistor each being a first one of a PMOS and an NMOS transistor and the third transistor and the fourth transistor each being a second one of the PMOS and the NMOS transistor.

6. The ADDF of claim 5, wherein gates of the first transistor, the second transistor, the third transistor and the fourth transistor of the internal signal generator circuit are configured to receive the first one of the two of the three complementary output signals, the one of the three input signals, a second one of the two of the three complementary output signals, and the first one of the two of the three complementary output signals, respectively, such that the gates of the first transistor and the fourth transistor both receive the first one of the two of the three complementary output signals and the second transistor receives the one of the three input signals without the one of the three input signals passing through a buffer.

7. The ADDF of claim 5, wherein the inverter of the internal signal generator circuit is configured to receive the internal signal from a connection between the second transistor and the third transistor, and to generate the complementary internal signal based on the internal signal.

8. The ADDF of claim 1, wherein the summation output signal generator circuit includes at least one transmission gate, a plurality of stacked transistors and an inverter.

9. The ADDF of claim 8, wherein the plurality of stacked transistors of the summation output signal generator circuit includes a first transistor, a second transistor, a third transistor and a fourth transistor connected in series between a source and ground, the first transistor and the second transistor each being a first one of a PMOS and an NMOS transistor and the third transistor and the fourth transistor each being a second one of the PMOS and the NMOS transistor.

10. The ADDF of claim 9, wherein gates of the first transistor, the second transistor, the third transistor and the fourth transistor of the summation output signal generator circuit are configured to receive the one of the three complementary output signals, the complementary internal signal generated by the internal signal generator circuit, the internal signal generated by the internal signal generator circuit, and the one of the three complementary output signals, respectively such that the gates of the first transistor and the fourth transistor of the summation output signal generator circuit both receive the one of the three complementary output signals.

11. The ADDF of claim 1, wherein the internal signal generator circuit and the summation output signal generator circuit have a same circuit layout.

12. The ADDF of claim 1, wherein the carryout signal generator circuit includes a pair of drivers and an inverter.

13. The ADDF of claim 12, wherein the pair of drivers are configured to receive respective ones of the two of the three complementary output signals, and selectively pass the respective ones of the two of the three complementary output signals to the inverter based on the internal signal and the complementary internal signal.

14. The ADDF of claim 1, wherein the complementary signal generator circuit is configured to receive the three input signals and the internal signal generator circuit is configured to receive the one of the three input signals without the three input signals passing through buffers.

15. A method for reducing area and power of an integrated circuit (IC) using a full adder Integrated circuit (ADDF), the method comprising:
generating, by a complementary signal generator circuit, three complementary output signals based on respective ones of three input signals, the three input signals each having one of a high logic level and a low logic level;
generating, by an internal signal generator circuit, an internal signal based on two of the three complementary output signals, and one of the three input signals, the internal signal generator circuit including a first transistor, a second transistor, a third transistor and a fourth transistor connected in series between a source and ground such that gates of the first transistor and the fourth transistor both receive a first one of the two of the three complementary output signals;
generating, by a summation output signal generator circuit, an output summation (SUM) signal based on one of the three complementary output signals, the internal signal and a complementary internal signal, the complementary internal signal being complementary to the internal signal; and
generating, by a carryout signal generator circuit, a carryout signal (CO) based on the two of the three complementary output signals, the internal signal and the complementary internal signal.

16. The method of claim 15, wherein the internal signal generator circuit and the summation output signal generator circuit each include at least one transmission gate, a plurality of stacked transistors and an inverter.

17. The method of claim 16, wherein the internal signal generator circuit and the summation output signal generator circuit have a same circuit layout.

18. The method of claim 15, wherein the generating the three complementary output signals comprises:
generating the three complementary output signals based on the respective ones of three input signals without the three input signals passing through buffers.

19. A full adder integrated circuit (ADDF), the ADDF comprising:
a complementary signal generator circuit configured to receive three input signals and generate three complementary output signals based on respective ones of the three input signals, the three input signals each having one of a high logic level and a low logic level;
an internal signal generator circuit configured to generate an internal signal based on two of the three complementary output signals and one of the three input signals;
a summation output signal generator circuit configured to generate an output summation (SUM) signal based on one of the three complementary output signals, the internal signal and a complementary internal signal, the complementary internal signal being complementary to the internal signal, the summation output signal generator circuit including a first transistor, a second transistor, a third transistor and a fourth transistor connected in series between a source and ground such that gates of the first transistor and the fourth transistor both receive the one of the three complementary output signals; and
a carryout signal generator circuit configured to generate a carry-out signal (CO) based on the two of the three complementary output signals, the internal signal and the complementary internal signal.

* * * * *